(12) United States Patent
Schmidt et al.

(10) Patent No.: US 7,663,045 B2
(45) Date of Patent: Feb. 16, 2010

(54) MUSIC REPLACEMENT IN A GAMING SYSTEM

(75) Inventors: Brian Lloyd Schmidt, Bellevue, WA (US); David Anthony William Pickford, Redmond, WA (US); Derek Hedin Smith, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 940 days.

(21) Appl. No.: 11/230,977

(22) Filed: Sep. 20, 2005

(65) Prior Publication Data

US 2007/0068367 A1   Mar. 29, 2007

(51) Int. Cl.
    *G10H 7/00* (2006.01)
(52) U.S. Cl. .......................... 84/600; 463/35
(58) Field of Classification Search ............. 463/30–32, 463/35–38, 43–44; 84/600
    See application file for complete search history.

(56) References Cited

U.S. PATENT DOCUMENTS

| 6,878,067 | B2 * | 4/2005 | Blanco ........................ 463/43 |
| 6,991,542 | B2 * | 1/2006 | Asami et al. ................. 463/35 |
| 2004/0005923 | A1 * | 1/2004 | Allard et al. ................. 463/35 |
| 2005/0064935 | A1 * | 3/2005 | Blanco ........................ 463/35 |

* cited by examiner

*Primary Examiner*—Jeffrey Donels
(74) *Attorney, Agent, or Firm*—Woodcock Washburn LLP

(57) ABSTRACT

A user of a game system can replace background music from a game with the user's selected background music, while still hearing any other audio streams (e.g. sound effects related to gameplay). A music engine and system audio mixer allow the playback of the user's requested replacement music. The game tags background music streams with an identifier indicating that they are background music, and such streams are muted at the music engine and system audio mixer (if the game is using the provided music engine in order to play the game's audio streams) or by the game if the game is using a game music engine and has received information indicating that a mute request has been issued.

25 Claims, 6 Drawing Sheets

MUSIC REPLACEMENT IN A GAMING SYSTEM

FIELD OF THE INVENTION

This application relates generally to gaming console systems, and more particularly, to the replacement of audio data from a gaming console device.

BACKGROUND OF THE INVENTION

When a user is playing a video game on a video game system, generally the video game controls the sounds which are being played by the video game system, either directly through speakers on the video game system or through a connection to a monitor or television incorporating speakers, another device incorporating speakers, or separate speakers. Game music can be repetitive and therefore annoying to the game player.

One solution that some users employ is to mute the sound from the video game, via a control provided by the video game (e.g. a volume or mute function). In some cases the control allows the user to have only video game sound effects, and not the music, play.

Another solution that some users employ is lowering the volume or muting completely the device through which the video game system is playing sounds. However, this is not selective, and dialogue and/or sound effects provided by the video game are muted as well as music provided by the video game.

In order to provide a user with flexibility in choosing background music for a video game, some video games provide a number of choices for background music. These choices of background music, however, are limited and may also grow repetitive for a user.

A few video game consoles, e.g. Microsoft's Xbox video game console, allow a user of a video game to request that the video game play user-selected music. For example, using such systems, a user could download a music file, and request that the video game play that music file as background music for the video game. However, this was only possible when implemented by the video game being played, and a video game developer had the entire complex task of implementing the functionality which allowed a user to provide and select music.

Thus, there is a need for a way to provide a user of a video game with the capability to replace certain audio elements (e.g. background music) of a video game used with a video game system without requiring extensive effort by the video game developer.

SUMMARY OF THE INVENTION

The invention provides techniques by which a video game system and associated video games provide users with the ability to customize the audio portion of their gameplay experience. The techniques allow for this customizability to occur without extensive effort by the video game developer. A video game system uses a tagging system by which video game designers tag the audio portions of the gameplay experience presented to the user via the video game console. The tags indicate which audio portions include background music. The video game system uses the tags to present to the user the option of replacing background music provided by the video game designer with alternate music. In one embodiment, a game will play its originally-authored music unless action is taken by the gamer. In an alternate embodiment, a game will remember the gamer's previous choice for music, and that choice is used to provide music the next time the game is played.

A video game system provides an audio engine. This audio engine allows playback of audio data. For example, a music engine may provide decoding, streaming and rendering for various formats of audio file, such as WMA and mp3. The audio engine is used to support the user's request (via a music console user interface (UI)) to play user specified music.

The audio engine can also be used by the video game to play audio files. The audio engine exposes application program interfaces (APIs) which can be used to enumerate playlists of stored music files, select music files, and play them. APIs which can be used by a video game to detect when a user has requested the replacement of background music are also included.

Only some embodiments of the invention have been described in this summary. Other embodiments, advantages and novel features of the invention may become apparent from the following detailed description of the invention when considered in conjunction with the drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The method and apparatus described herein allow the user of a gaming system the ability to replace background music in a game or a multimedia application running on the game console with their selected music.

Exemplary Gaming System

Figure 1:
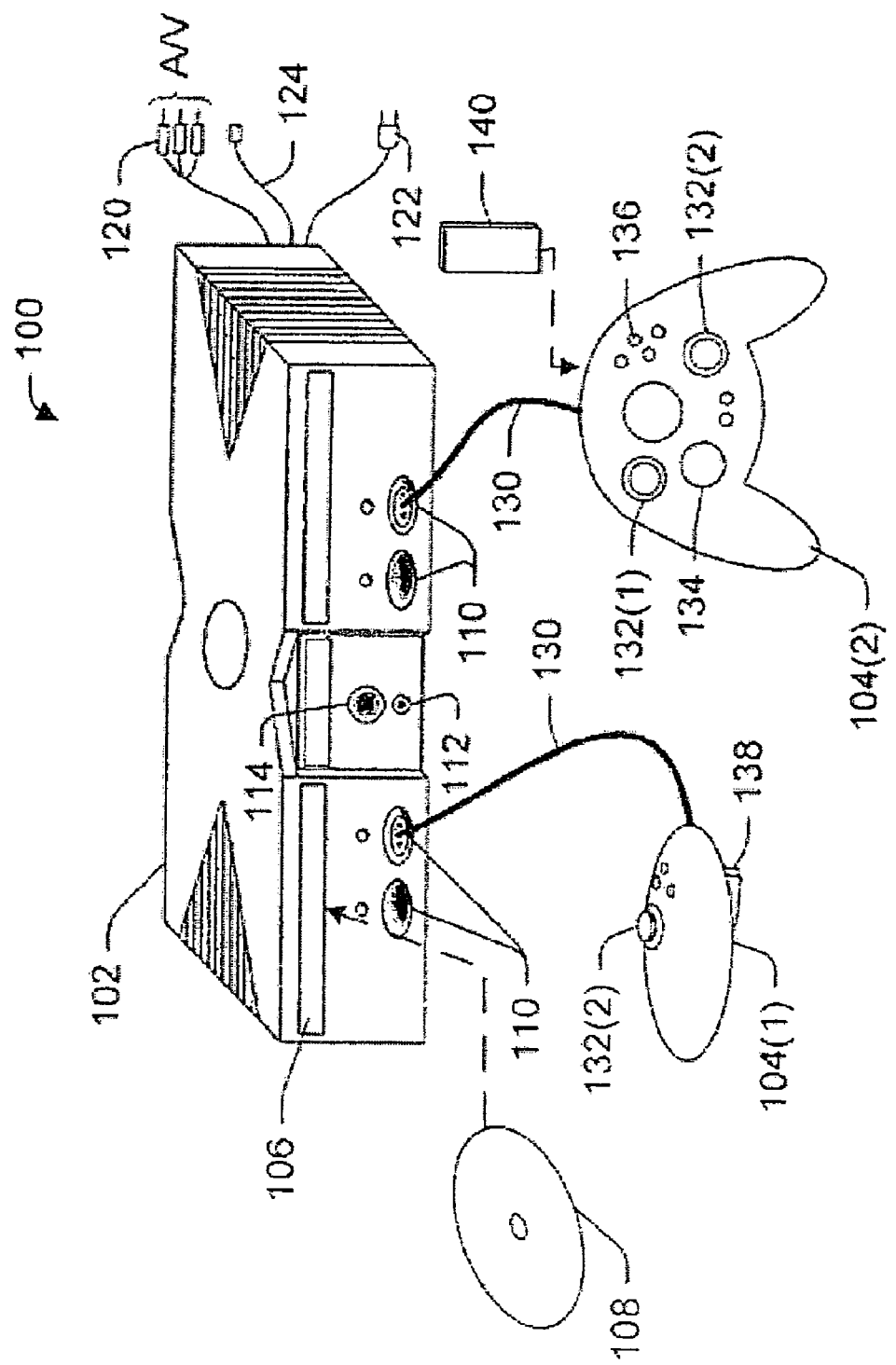
FIG. 1 illustrates a gaming system that implements a uniform media portal architecture.

FIG. 1 shows an exemplary gaming system 100. It includes a game console 102 and up to four controllers, as represented by controllers 104(1) and 104(2). The game console 102 is equipped with an internal hard disk drive and a portable media drive 106 that supports various forms of portable storage media as represented by optical storage disc 108. Examples of suitable portable storage media include DVD, CD-ROM, game discs, and so forth.

The game console 102 has four slots 110 on its front face to support up to four controllers 104, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the optical storage disc 108.

Game console 102 connects to a television or other display (not shown) via A/V interfacing cables 120. A power cable 122 provides power to the game console. The game console 102 may further be configured with broadband capabilities, as represented by the cable or modem connector 124 to facilitate access to a network, such as the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a D-pad 134, buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and port them for play on other consoles. In the described implementation, each controller 104 is configured to accommodate two memory units 140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back include:

1. Game titles played from CD and DVD, from the hard disk drive, or from an online source.
2. Digital music played from a CD in the portable media drive 106, from a file on the hard disk drive (e.g., Windows Media Audio (WMA) format), or from online streaming sources.
3. Digital audio/video played from a DVD disc in the portable media drive 106, from a file on the hard disk drive (e.g., Active Streaming Format), or from online streaming sources.

Figure 2:
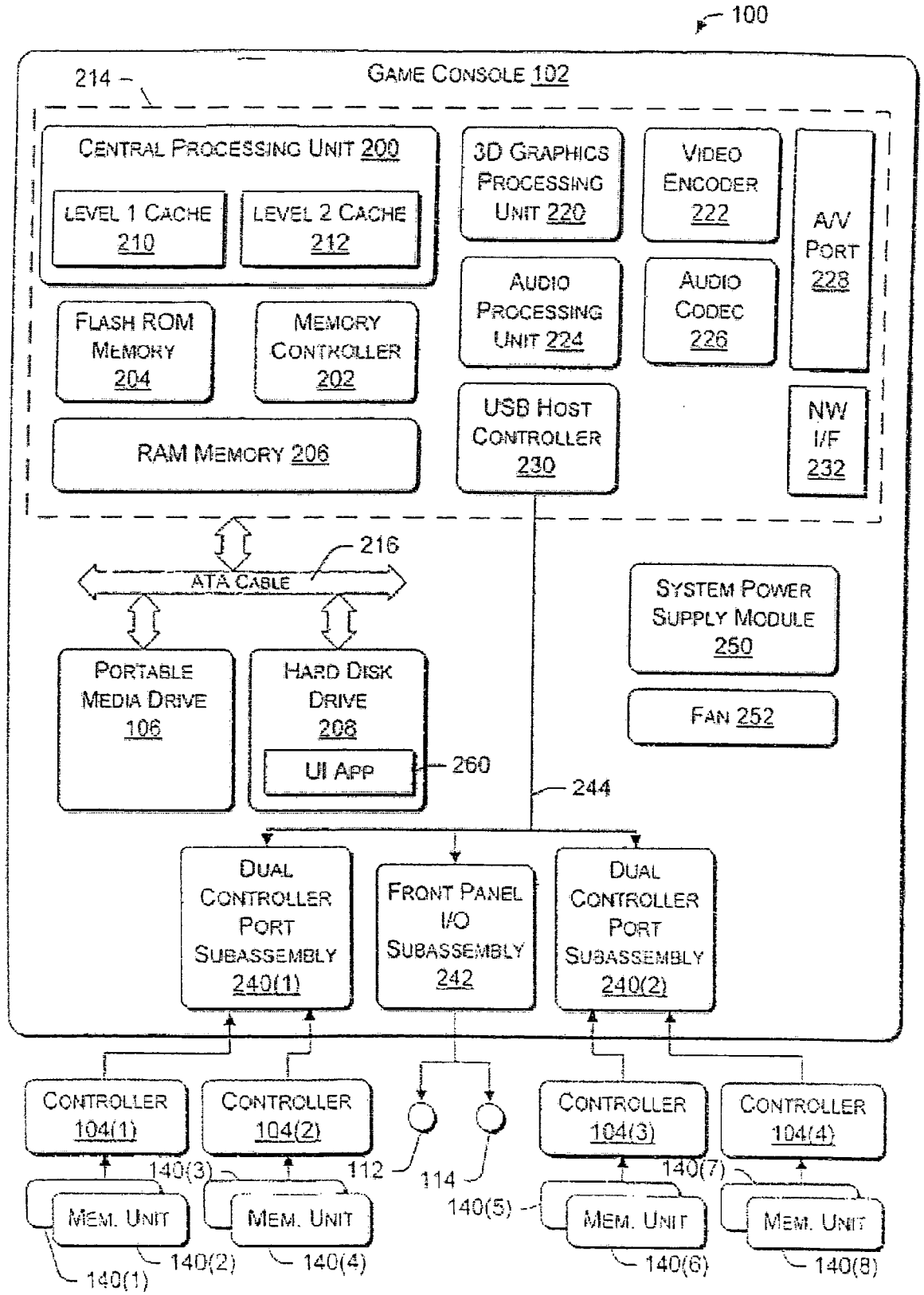
FIG. 2 is a block diagram of the gaming system.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR it SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an ANV (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. The network interface 232 may connect to a network. Such a network may be public (e.g. the Internet), private (e.g. a residential local area network (LAN)) or some combination of public and private. Such a network may introduce another memory source available to individual gaming systems 100-online storage. In addition to the portable storage medium 108, the hard disk drive 208, and the memory unit(s) 140, the gaming system 100(1) can also access data files available at remote storage locations via the network.

Music in a Gaming System

While many games have highly integrated interactive music, a sizable number of other types of games simply "play tunes" for their background music. For example, many action sports games simply include background music not highly integrated into the action, e.g. a snowboarding game which plays music unrelated to the action as the user virtually heads down the slopes. In some embodiments, the gaming system allows the user to replace the background music of a game or other application being run on the gaming system with other music of their own selection. (While it is contemplated that, in general, both the audio data which a game is playing as background and the audio data the user selects to be played replacing that data are music, the use of the term "music" is not intended to be limiting in any way, and both the background to be replaced and the user-selection may be any audio data.)

In a gaming system 100, audio data may be played from different sources. Audio data may be stored in memory within the gaming system 100, such as a hard disk drive 208 or memory unit 140, stored on media (e.g. portable medium 108) in a media reader (e.g. drive 106) in or directly attached to gaming system 100, or may be available via a network. A locally connected personal computer may be a source of music, as can a connected portable personal music player device.

The user of a gaming system uses a game controller 104 or other user input device to the gaming system to view a music player user interface (UI). This music player UI may be a separate UI or may be part of a UI with broader utility. The music player UI allows the user to browse music stored in or accessible to the gaming system. Playlists organizing music files may be supported in the music player UI. The user uses the music player UI to start playback of one or more selected music files. When this occurs, if a game or other application with background music is running (or begins), the background music is muted.

Figure 3:
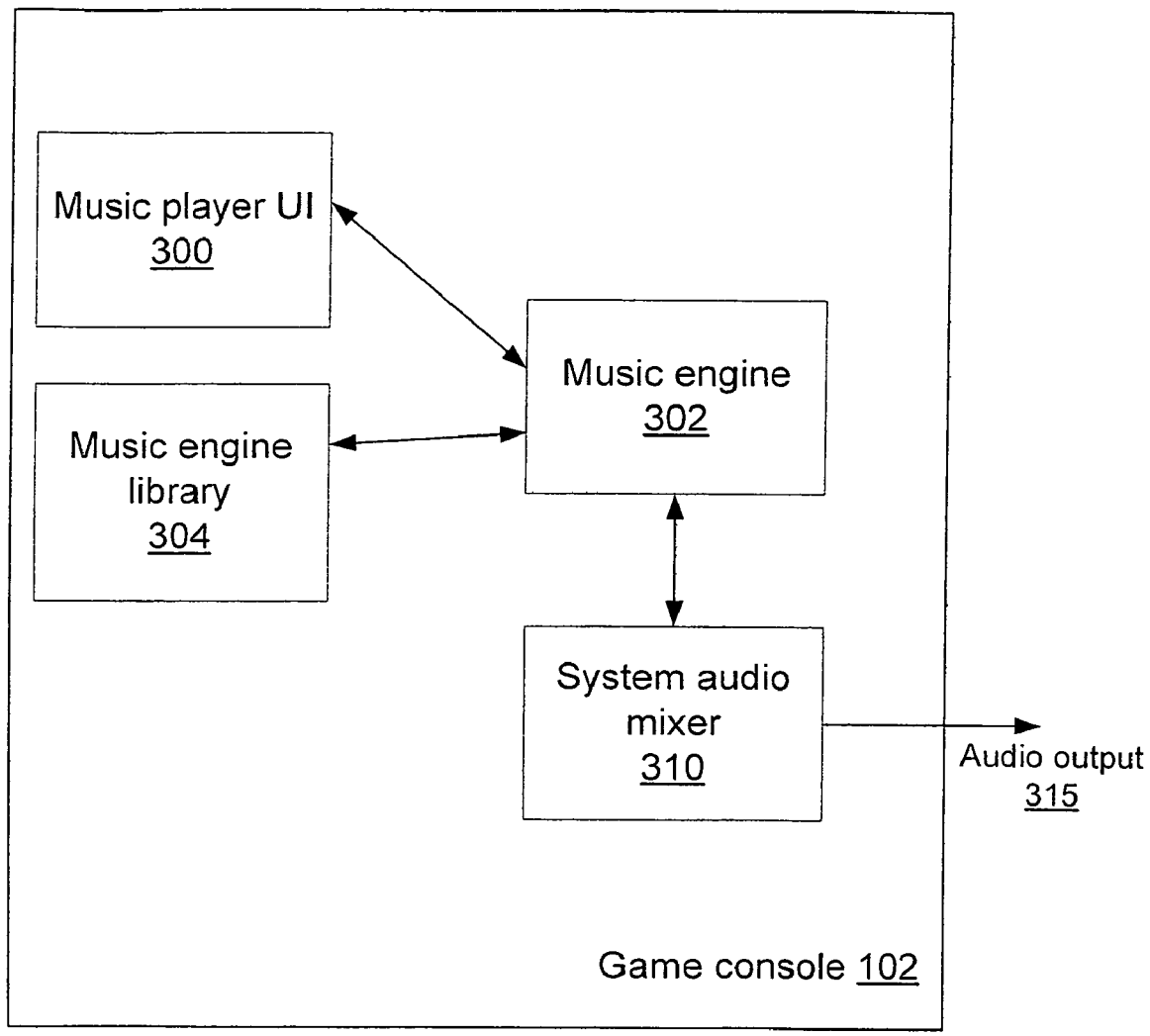
FIG. 3 is a block diagram of the interaction between the music player engine and other parts of the game console according to one embodiment of the invention.

In some embodiments, the game console 102 includes a music player engine in order to play the music files selected by the user via the music player UI. FIG. 3 is a block diagram of the interaction between the music player engine and other parts of the game console 102. As seen in FIG. 3, the music player UI 300 utilizes the music engine 302. In addition, music engine 302 can be used by game or other applications running on game console 102 via music engine library 304, which contains a set of application program interfaces (APIs) used to request services from the music engine 302, such as enumeration of playlists, selection of audio files and playing of audio files. Thus information can be obtained by a game about the currently playing music and this information can be integrated into the game. For example, if a game simulates the experience of driving a car, a car stereo can be simulated which allows the user to pick stations correlated with existing playlists, or can include a display of the current title playing.

In some embodiments, music engine library 304 also contains APIs used by applications running on the game console 102 in order to allow an application to have information regarding whether the user has decided to replace the application's background music. Music engine 302 provides audio data to a system audio mixer 310. The system audio mixer 310 acts as the gateway between all parts of the game console 102 and the audio output. While other components may act on the audio signal after it leaves the system audio mixer 310 (for example, Dolby encoding) the system audio mixer 310 functions as the audio mixer for the entire game console 102 and determines what audio will be output from the game console 102, e.g. via audio codec 224 (from FIG. 2) and A/V cables 120 (from FIG. 1). With reference again to FIG. 2, in one embodiment, the system audio mixer 310 is audio processing unit 224, and in another, audio processing unit 224 includes all or part of the functionality of the system audio mixer 310. In another embodiment, no audio processing unit 224 is present, but the functionality of the audio processing unit 224 is performed by system audio mixer 310.

The music engine 302 is implemented as a set of concurrent services that perform decoding and playback from various music formats, playlist enumeration, data streaming and any necessary digital rights management support. As a concurrent system service, the CPU, memory and bandwidth for the music engine 302 is allocated from the system application budget. Access to the music engine 302 is provided in the form of a set of APIs (application program interfaces) that form music engine library 304. The music engine serves both the music player UI 300 and any games or other software running on the gaming system which requests music engine service.

Figure 4:
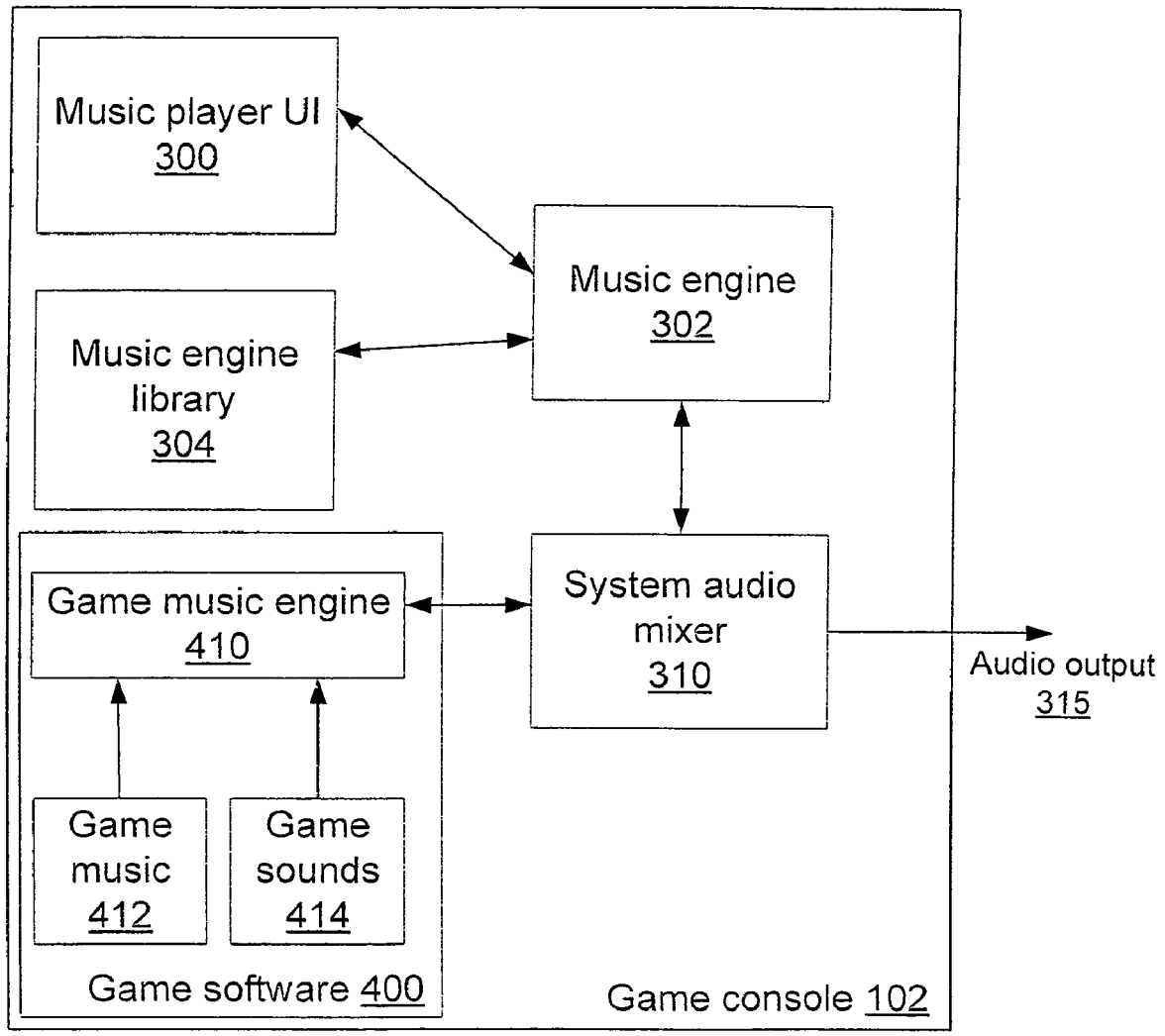
FIG. 4 is a block diagram of the relationship between system software in the game console and game software separately providing a game music engine according to one embodiment of the invention.

Some games do not use the music engine 302 in order to provide audio (background music and other audio output) to the user. FIG. 4 is a block diagram of the relationship between system software in the game console 102 and game software separately providing a game music engine. As shown in FIG. 4, while music engine 302 still provides audio output to the system audio mixer 310, the game software 400 has a game music engine 410, instead of utilizing the music engine 302. Game background music 412 and all other game sounds 414 are played through the game music engine 410, which provides audio playback information to the system audio mixer 310. In order for replacement of background music 412 by a user utilizing music player UI 300, a mute control signal is provided by the music engine 302 to the game music engine 410. If the mute control signal indicates that the user has requested replacement of the background music, the game music engine 410 does not request that system audio mixer play game background music 412, but only that it play other game sounds 414.

Figure 5:
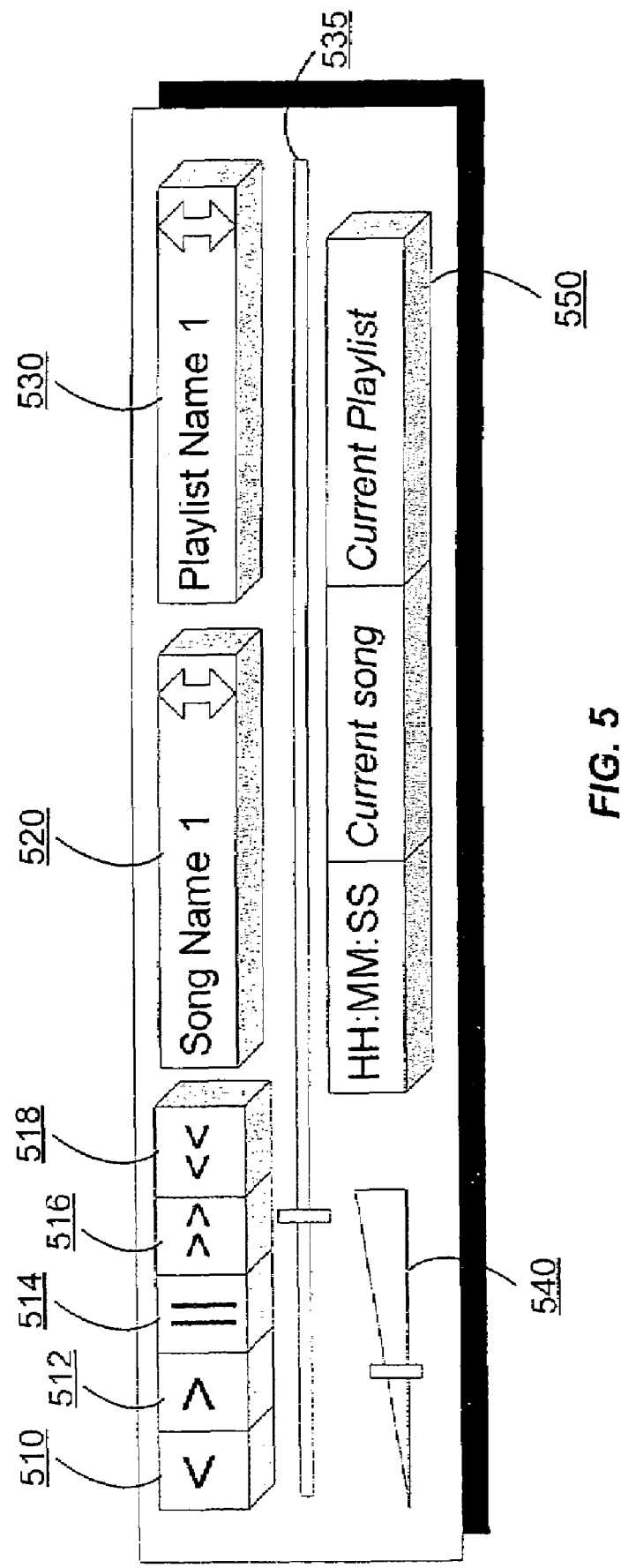
FIG. 5 illustrates an exemplary graphical user interface depicting the music player UI.

FIG. 5 illustrates an exemplary graphical user interface 500 depicting the music player UI 300. The graphical user interface 500 would be displayed using all or part of a display associated with gaming system 100. As shown in FIG. 5, the graphical user interface includes selectable areas such as reverse area 510, forward area 512, pause area 514, skip forward area 516 and skip backwards area 518. These areas allow a user to pause music and to move within music tracks or to a new track. Song name area 520 displays the name of a song and allows the user to view all songs in a playlist and choose among them, and playlist name area 530 displays the name of a playlist and allows the user to view all the playlists available and choose among them. Time elapsed bar 535 shows how much time (relative to the total length) has elapsed in a track or a playlist. Volume slider and bar 540 allows the user to control the volume. Current play information area 550 includes information such as the current song and playlist, and timing information (such as how much more time the playlist will take to play, or how much time a song or playlist has been playing.

As previously mentioned, in many cases, the game designer will include game-specific UI for music selection. The specific UI in the case of the game simulating the experience of driving a car should have the look of an in-dash music player (e.g. car stereo console) as part of the car interior dashboard art. The user can then use the game-specific UI to change or otherwise affect the music, or can call up the music player UI 300 to make such changes. Any updates made in playlist, song, volume, etc, are updated in the game's own artwork. As another example, a game providing a user with a virtual reality experience may also provide a personal music player UI which allows the user to select a playlist from game-provided music tracks, as well as local and net-connected playlists. Any changes made in the game UI are reflected in the music player UI, and vice-versa. In one embodiment, when a game is being played, the music player UI 300 which is presented to the user contains a limited subset of the music player UI 300 which might otherwise be available. This allows the user to have easy access to features a user would want during game play without the complexity of displaying other features.

Replacement of Music

In this way, when a game is run by a user on the game console 102, the user can decide whether to hear the game as authored, with the background music provided by the game, or to replace background music. In order to replace the background music, in one embodiment, the user activates the music player UI 300 and requests music to play. The music player UI 300, along with other components of the gaming system 100 replaces the background music provided by the game with their own background music.

Figure 6:
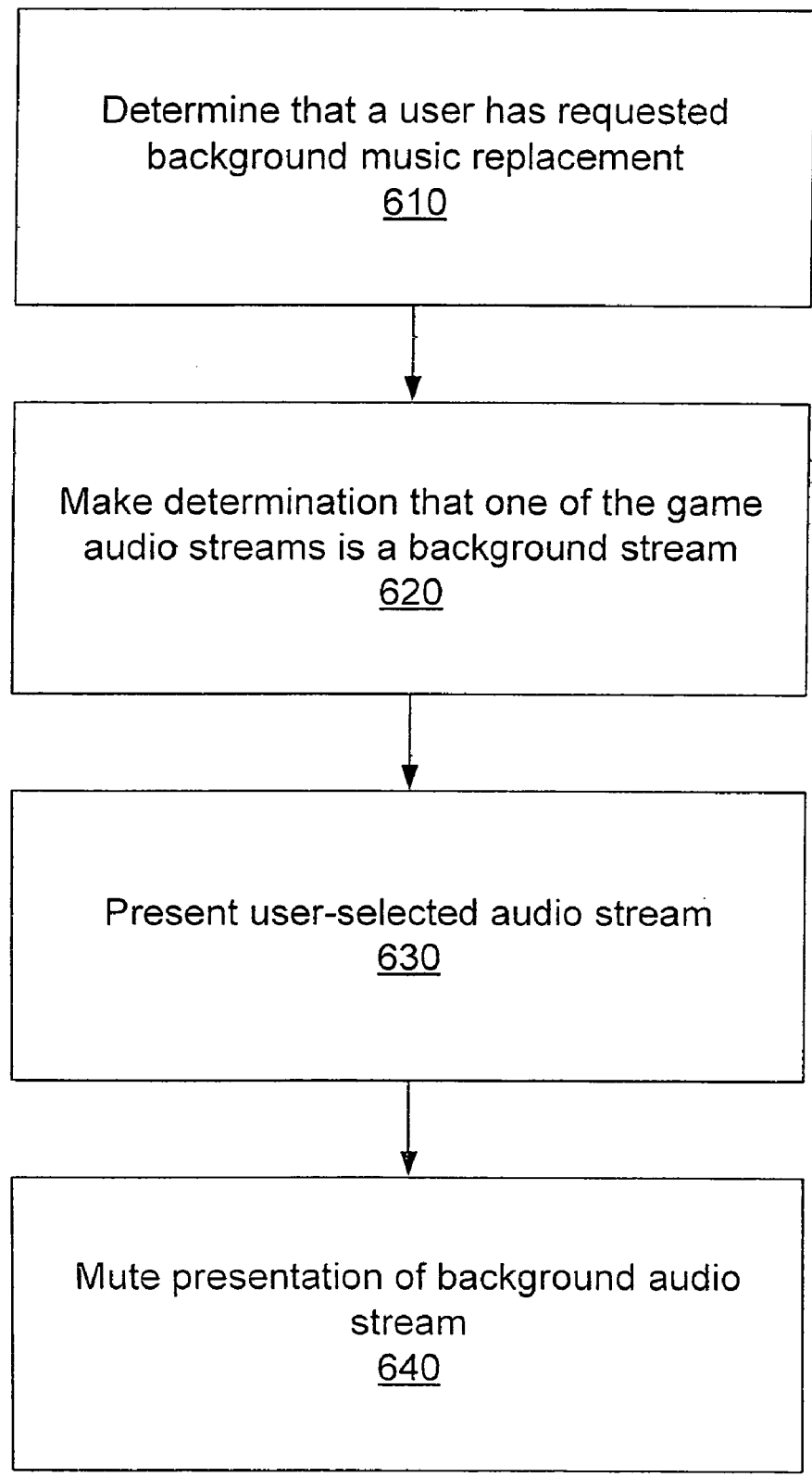
FIG. 6 is a flow diagram showing a process of replacing game music according to one embodiment of the invention.

FIG. 6 is a flow diagram showing a process of replacing game music according to one embodiment of the invention. As shown in FIG. 6, audio output for a game system running an application (such as a game) generating at least one game audio stream, is provided. First, in step 610, a determination is made that the user has requested replacement of background music with a user-selected audio stream. In step 620, a determination is made that at least a first game audio stream is a background stream. As describe below, this may be through tagging of the background stream by the game. In step 630, the user-selected audio stream is presented, and in step 640, the presentation of the background audio stream is muted. This muting may be temporarily disabled, as described below. More than one background audio stream may be detected as a background stream in step 620 and muted in step 640.

In some embodiments, the user's choice is persisted by the game console 102, so that when, in the future, the user again plays the game, the user's selected replacement music is played in place of the game background music. If the selected replacement music is unavailable, the background music is played. In alternate embodiments, if the selected replacement music is unavailable, an informational message is shown to the user to alert the user that the replacement music is unavailable. The informational message, in one embodiment, allows the user to request music player UI 300.

In one embodiment, if the user is playing music via music player UI 300, and has not previously requested replacement of the background music for a game, when the game is started, the game's background music is automatically replaced by the music being played. In another embodiment, the user is asked to decide whether to automatically replace the background music of the game in favor of the music being played.

Many games play a soundtrack consisting of complex interactive music and audio for a user. Such soundtracks include multiple elements, such as background streams and sound effects. Games may either use the music engine 302 or their own game music engine 410 in order to play their soundtracks. In order to mute only the background music, and not game sounds, according to one embodiment, the game must tag background music as background music (when using the music engine 302) or mute background music (when using a game music engine 410) in order to allow the background music to be replaced. Where the music engine 302 is used to play the background music, in order to provide replacement of game music, the music engine 302 communicates with a game's audio via private or public methods which allow the game to tag an audio stream as background music, and allow the music engine to determine if an audio stream has been tagged as background music.

Any audio stream tagged as background music can be selectively muted when the user has selected to play other music in place of the games background music. In one embodiment, the game does not receive information that this muting is happening. In another embodiment, an API allows the game to determine whether muting is occurring. If the game does not know that muting is occurring, the game will continue to use the same system resources and render its own background music, but it is not played by the music engine 302 (or, depending on the implementation of music engine 302, it is played with a zero volume). If the game is allowed to know that muting is occurring, the game may be created in such a way that when muting is occurring the rendering of background music does not occur, to save system resources. In one embodiment, when transitioning from the game supplied background music to the user supplied background music, a smooth, quick crossfade is performed.

In one embodiment, when the replacement music becomes unavailable, the games background music is again played for the user. For example, if the user chooses to substitute the game music with music available via a network and a network outage occurs or the music otherwise becomes unavailable, the game music will be substituted.

In one embodiment, the user's preference for replacing game background music with the user's selected music is persisted. This persistence is, depending on embodiment or user selection, a preference which is persisted on a per-session, per-game, or continuous basis. The game system 100 can persist both the user's preference and the selection of music being played. Thus, in one example, a game system 100 which had previously been used to play a game, with the background music replaced by the user with specified playlists, these playlists will again be used when the game is next used. Alternately, the state of play is also persisted. The game system 100 begins playing the playlist (replacing the background music) from the track which was playing when the game exited, or from the point in the track which was playing.

Exceptions to Music Replacement

Many games play complex interactive music and audio for a user. Such soundtracks include multiple elements, such as background streams and sound effects. As described above, games may either use the music engine 302 or their own game music engine 410 in order to play their soundtracks. In order to mute only the background music, and not game sounds, according to one embodiment, the game must tag background music as background music (when using the music engine 302) or mute background music (when using a game music engine 410) in order to allow the background music to be replaced.

However, in one embodiment, even when a user has requested that the game's supplied music be swapped out in favor of other music the user selects at certain times the replacement is not made. One example is a "cut scene" video in a game. Cut scenes are presentations intended to be shown in their entirety, including audio. For example, if a game is based on a movie, a cut scene may be a scene from the movie. Such cut scenes may be rewards for reaching a certain level. If it is determined that a majority of users want to hear the cut scene without any additional music, forcing users to manually request (via UI) music that replacement of audio be halted may be problematic for user satisfaction. In order to allow the user to enjoy the full presentation of the cut scene without requiring the user to manually change the replacement options, during a cut scene music replacement is automatically halted.

Another practical reason may be present for halting music replacement during cut scenes. While a game can include multiple audio streams, including background and sound effects, a cut scene from a movie will generally have only one audio stream associated with it—the entire soundtrack is pre-mixed into a single stereo (or multichannel) file that is interleaved with the video. Since the music, sound effects, and dialog are pre-mixed, it is not possible to swap out only the background music.

Other examples of when music replacement may be halted include during title screens and other informational or advertising screens, which may have associated music which is intended to be presented without alteration.

For these reasons, among others, in one embodiment, a mechanism is provided which allows the game selectively override the user's music replacement request. In one embodiment, this is done via an override API which is called by the game when the user's music replacement selection is to be overridden.

In one embodiment, the user can choose whether the game has the ability to override the user's music replacement choice—in one game, for example, where the user does not care about cut scenes, the user can decide that the game should not be able to override the user's selection of other music to play. In another game, the same user may be more interested in the cut scene audio track, and may allow the game to decide whether the music replacement choice is to be overridden.

In order to ensure that the game does not use the override API improperly, in one embodiment of the invention, the game is subject to technical certification. A game only passes technical certification if it will correctly allow music replacement. The situations in which an override request may be issued is detailed in a requirements document.

Possible items in a requirement document include:
proper tagging: correctly tagging background music with tags indicating that it is background music (and thus may be replaced);
requesting an override of user-selected replacement only in specific situations;
not overriding the user-selected replacement via the music engine 302 (and music engine library 304 functions)
games with integrated user-selection of non-game music (e.g. a virtual car radio in a racing game which allows the user to choose music not supplied by the game) must allow the user to select music from any selected media; and
in certain embodiments, using the music engine 302 only for background music.

APIs for Use in Music Playback

APIs can be included in the music engine library 304. Control APIs can be used by the game in order to control the playing of music via music engine 302. Content and enumeration APIs allow information about user playlists and songs, and creation of temporary playlists. Certain event notifications are also sent to the game when music engine library APIs are being used.

In one embodiment, the following Control APIs are provided in the music engine library 304:

| Method | Description |
| --- | --- |
| XMPSelectSong | Select a song within a playlist |
| XMPSelectPlaylist | Set the current playlist |
| XMPPlay | Play a playlist or song (will mute the game's background music) |
| XMPStop | Stop playback (if the user-selected music is stopped, the game's background music is unmuted) |
| XMPPause | Pause playback |
| XMPNext | Skip to next song in playlist |
| XMPPrevious | Skip back to previous song in playlist |
| XMPSetPlaybackBehavior | Sets playback behavior (e.g. shuffle, repeat, crossfade tracks, etc) |
| XMPGetStatus | Returns status information for music playback (e.g. whether a song is playing, etc.) |
| XMPGetVolume | Return the current volume level |
| XMPSetVolume | Set volume of music playback. |
| XMPOverrideUserMusic | Temporarily override the user's chosen music |

In one embodiment, the following content and enumeration APIs are provided in the music engine library 304:

| Method | Description |
| --- | --- |
| XMPCreatePlaylist | Create a temporary playlist to play back music |
| XMPDeletePlaylist | Delete a temporary playlist |
| XMPFindFirstPlaylist | Enumerate the first playlist available to music player |
| XMPFindNextPlaylist | Continue enumeration of playlists |
| XMPGetSongInfo | Get info about the song currently playing |
| XMPAddSong | Add song to a temporary playlist for the duration |
| XMPRemoveSong | Remove song from the temporary playlist |
| XMPGetFirstSong | Find the first song in a playlist |
| XMPGetNextSong | Get the next song in a playlist |

Use of the music engine library will result in the following notifications being sent.

| Method | Description |
| --- | --- |
| Player Start | Notification that a new song has started playback |
| Player Paused | Player has been paused |
| Player Stopped | Player has been stopped |
| Playlist End | Notification that the final song in the playlist has completed |
| Game Control | The gamer has re-set the game to "use game's music" via the Xenon UI |
| Playlist Lost | The currently playing is no longer available. |

Additionally, an API may be made available which allows a request to be made that muting of background music from the game be temporarily halted. Such an API allows the game to request that all music streams originating from the game be played. Depending on the embodiment, this request is granted in all cases, or it is granted only in cases where the user has decided to allow such temporary halting of music replacement.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A system for providing audio playback from a gaming system running an application, wherein said application generates an application default audio stream, said system comprising:
    application programming interfaces, said application programming interfaces integrating gaming system audio playback control features into said application, wherein audio commands issued by said application are implemented by said gaming system concurrently with execution of said application;
    an audio input for receiving said audio commands and said application default audio stream from said application;
    an audio replacement indicator for indicating when replacement of said application default audio stream is requested;
    an audio output, operably connected to said audio input and said audio replacement indicator, wherein said audio output plays audio comprising said application default audio stream if said audio replacement indicator indicates that no audio replacement is requested, or an alternate audio stream if said audio replacement indicator indicates that audio replacement is requested.

2. The system of claim 1, wherein said audio replacement indicator is programmed such that its default selection state indicates that no audio replacement is requested.

3. The system of claim 1, wherein said application default audio stream comprises a background music audio stream, and wherein, if said audio replacement indicator indicates that audio replacement is requested, said audio output plays audio comprising said alternate audio stream.

4. The system of claim 3, wherein said audio output is programmed to mute said background music audio stream if said audio replacement indicator indicates that audio replacement is requested.

5. The system of claim 3, wherein said background music audio stream is tagged by said application as background.

6. The system of claim 1, wherein, if said audio replacement indicator indicates that audio replacement is requested, said audio output plays:
    audio comprising said alternate audio stream if said application does not indicate an override of said audio replacement indicator; and
    audio comprising said application default audio stream if said application does indicate an override of said audio replacement indicator.

7. The system of claim 1, wherein if said audio replacement indicator indicates that audio replacement is requested, said alternate audio stream is an audio stream specified by said user.

8. The system of claim 7, wherein said audio output is programmed to act as if said audio replacement indicator indicates that no audio replacement is requested if no audio stream is specified by said user.

9. The system of claim 1, said system further comprising:
    a mute signal transmitter for, if said audio replacement indicator indicates audio replacement is selected, sending a mute signal to said application.

10. A method for providing audio playback from a gaming system running an application, wherein said application generates application default audio streams and controls said audio playback via application programming interfaces, said method comprising:
    integrating gaming system audio playback control features into said application, via said application programming interfaces;
    executing by said gaming system, concurrently with said running of said application, audio playback commands issued by said application via said integrated gaming system audio playback control features;
    determining that a user has requested replacement of background music audio with an alternate audio stream;
    determining that a first audio stream of said application default audio streams is a background music stream;
    muting playback of said first audio stream; and
    playing said alternate audio stream.

11. The method of claim 10, wherein a second audio stream from said application default audio streams is not a background music stream, said method further comprising:
    playing said second audio stream.

12. The method of claim 10, further comprising:
    receiving a request to override said user requested replacement of background music audio;
    temporarily muting playback of said alternate audio stream; and
    playing at least one of said application default audio streams.

13. The method of claim 10, further comprising:
    receiving a request to override said user requested replacement of background music audio;
    determining whether said user has requested that overriding of said user requested replacement of background music audio be allowed; and
    if said user has requested that overriding of said user requested replacement of background music audio be allowed:
        temporarily muting playback of said alternate audio stream; and
        playing all of said application default audio streams.

14. The method of claim 10, wherein said step of determining that a user has requested replacement of background music audio with an alternate audio stream comprises:
    providing a user interface to said user, wherein said user interface allows said user to indicate a request to replace playback of said background music audio with playback of an alternate audio stream.

15. The method of claim 14, wherein said user interface further comprises an audio stream selection user interface for allowing said user to select an audio stream for playback as said alternate audio stream.

16. A computer-readable storage medium having stored thereon computer-executable instructions that when executed by a processor perform the steps of:
providing audio playback; and
providing application programming interface methods to an application running on a gaming system and to a user interface displayed via said gaming system, wherein said application programming interface methods comprise:
integrating gaming system audio playback control features into said application;
executing by said gaming system, concurrently with said running of said application, audio playback commands issued by said application via said integrated gaming system audio playback control features;
providing a method for controlling said audio playback; and
allowing a user to request, using said user interface, that playback of an application default audio stream originating from said application be muted, and that an alternate audio stream be played.

17. The computer-readable storage medium of claim 16, wherein said application programming interface methods farther comprise a method for requesting information regarding said audio playback.

18. The computer-readable storage medium of claim 16, wherein said application programming interface methods farther comprise methods for sending a notification regarding an event connected with said audio playback.

19. The computer-readable medium of claim 16, wherein said application programming interface methods farther comprise a method for said application to request that said muting be temporarily discontinued, and wherein, upon receiving said request for temporarily discontinuing said muting, said application default audio stream is played and playback of said alternate audio stream is muted.

20. The computer-readable storage medium of claim 19, wherein said application programming interface methods further comprise a method for said user to indicate whether said muting of said application default audio stream can be temporarily discontinued, and wherein, if said user has indicated that said muting of said application default audio stream can be temporarily discontinued, said muting of said application default audio stream is discontinued and playback of said alternate audio stream is muted.

21. The system of claim 1, wherein said alternate audio stream comprises audio stored on a portable media storage device.

22. The system of claim 1, wherein said alternate audio stream comprises audio stored on a portable media player.

23. The system of claim 1, wherein said alternate audio stream comprises audio stored on a network connected computer or storage device.

24. A gaming console comprising:
a memory;
a processor coupled to said memory; and
an application stored in said memory and executable on said processor, the application configured to:
control, via control features integrated into said application by application programming interfaces, gaming console audio playback;
execute by said gaming console, concurrently with execution of said application, audio playback commands issued by said application via said integrated control features;
determine if a user selection has been made to replace an application default audio stream from said application; and
replace said application default audio stream with an alternate audio stream when such a user selection has been made, wherein said alternate audio stream comprises audio stored remotely from said gaming console.

25. A gaming console as recited in claim 24, wherein the application is a console application.

* * * * *